(12) United States Patent
Shackelford

(10) Patent No.: US 7,805,584 B2
(45) Date of Patent: *Sep. 28, 2010

(54) METHOD AND SYSTEM FOR RESTORING DATA

(75) Inventor: David Michael Shackelford, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 459 days.

This patent is subject to a terminal disclaimer.

(21) Appl. No.: 11/833,207

(22) Filed: Aug. 2, 2007

(65) Prior Publication Data

US 2007/0271410 A1  Nov. 22, 2007

Related U.S. Application Data

(63) Continuation of application No. 10/779,542, filed on Feb. 13, 2004, now Pat. No. 7,475,211.

(51) Int. Cl.
*G06F 12/00* (2006.01)
*G06F 13/00* (2006.01)
*G06F 13/28* (2006.01)

(52) U.S. Cl. ................. 711/162; 711/170
(58) Field of Classification Search .......... 711/170, 711/162
See application file for complete search history.

(56) References Cited

U.S. PATENT DOCUMENTS

| | | | |
|---|---|---|---|
| 5,455,946 A | 10/1995 | Mohan et al. | |
| 5,623,669 A | 4/1997 | Kincaid | |
| 5,870,553 A * | 2/1999 | Shaw et al. | 709/219 |
| 6,047,294 A | 4/2000 | Deshayes et al. | |
| 6,061,770 A | 5/2000 | Franklin | |
| 6,065,010 A | 5/2000 | Otsuka et al. | |
| 6,237,062 B1 | 5/2001 | Carlson et al. | |
| 6,438,660 B1 | 8/2002 | Reams | |
| 6,442,604 B2 * | 8/2002 | Romine | 709/219 |
| 6,920,537 B2 * | 7/2005 | Ofek et al. | 711/163 |
| 7,007,048 B1 * | 2/2006 | Murray et al. | 707/204 |
| 7,020,668 B2 * | 3/2006 | Matsuda et al. | 707/206 |
| 2001/0047461 A1 | 11/2001 | Milillo et al. | |
| 2002/0083085 A1 | 6/2002 | Davis et al. | |

(Continued)

OTHER PUBLICATIONS

"Workstation Solutions Announces New Quick Restore Data Protection Software for Windows 2000 and Linux Users", Reliaty, May 21, 2001, 2 pages, http://www.reliaty.com/about/pr__20010521.html (visited Mar. 31, 2003).

(Continued)

*Primary Examiner*—Sheng-Jen Tsai
(74) *Attorney, Agent, or Firm*—David W. Victor; Konrad Raynes and Victor LLP

(57) ABSTRACT

One aspect of the invention is a method for restoring data, which for example, includes receiving a request for at least a portion of the data. This example also includes creating a directory entry for the data in a virtual file system, and allocating storage space for the data. This example further includes initializing a block virtualization indicator to a value indicating that the data is not available. This example additionally includes writing a subset of the data to the storage space, and changing the block virtualization indicator to a value indicating that the data is available.

36 Claims, 5 Drawing Sheets

U.S. PATENT DOCUMENTS

| | | | |
|---|---|---|---|
| 2002/0103943 A1* | 8/2002 | Lo et al. ........................ | 710/2 |
| 2002/0107877 A1 | 8/2002 | Whiting et al. | |
| 2003/0093439 A1* | 5/2003 | Mogi et al. ................. | 707/200 |
| 2003/0172149 A1* | 9/2003 | Edsall et al. ................ | 709/224 |
| 2003/0177330 A1* | 9/2003 | Idei et al. .................... | 711/202 |
| 2003/0229645 A1* | 12/2003 | Mogi et al. ................. | 707/102 |
| 2004/0172509 A1* | 9/2004 | Takeda et al. ............... | 711/162 |

OTHER PUBLICATIONS

"Veritas Database Edition 3.0 for Oracle Frequently Asked Questions", 1999, pp. 1-6 plua cover sheet and end sheet, Veritas Software Corporation, Mountain View available at http://eval.veritas.com/webfiles/docs/presskits/oracleedition30/Press_FAQ_0901.doc.

"Generate Unique and Recoverable Object Identifier", IBM Technical Disclosure Bulletin, Nov. 1989, pp. 112-115, vol. 32, No. 6B, IBM Corporation, Armonk.

"Centralized and Rapid Backup/Restore for Work LAN File Services/VM", IBM Technical Disclosure Bulletin, Aug. 1992, pp. 286-289, vol. 35, No. 3, IBM Corporation, Armonk.

* cited by examiner

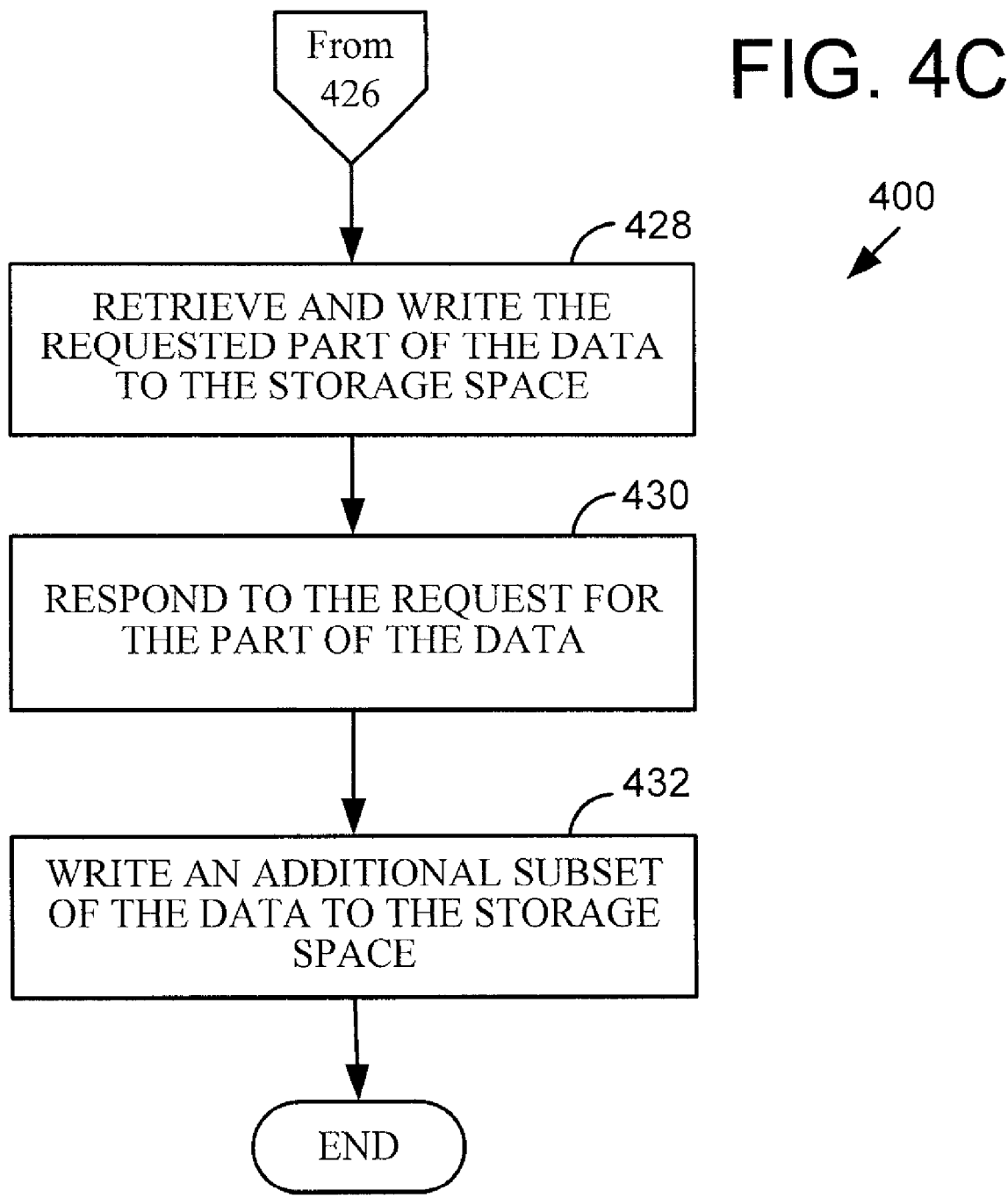

METHOD AND SYSTEM FOR RESTORING DATA

CROSS-REFERENCE TO RELATED APPLICATIONS

This application is a continuation of U.S. patent application Ser. No. 10/779,542, filed Feb. 13, 2004 now U.S. Pat. No. 7,475,211, titled "Method and system for restoring data", which is incorporated herein by this reference.

BACKGROUND

1. Technical Field

The present invention relates to restoring data. More particularly, the invention concerns restoring data and permitting access to the data while the data is being restored.

2. Description of Related Art

In modern computing systems, data is often backed up to provide protection from data loss if the original data becomes corrupted, and/or to archive the data. Magnetic or optical tape is often used for backing up data. Because the data is stored sequentially on the tape, restoring the data takes the amount of time required to read the tape from the beginning to the end of the data.

An application program may require access to data that has been backed up onto tape. However, before the application can use the data, the application must wait for the data to be retrieved from the backup. More specifically, when an application requests a file which must be restored from tape, the application must wait for the time required to restore the entire file. The delay is linearly proportional to the size of the file, and is exacerbated with large files. This delay is present when data is restored from a sequential data format, such as tape, to a direct access format such as a magnetic disk, and more generally is present whenever data is restored from one format to another, for example when compressed archived data is restored to an uncompressed format.

Although an application may require information from only a portion of a large file, with previously known techniques the application cannot be allowed access to the desired portion of the file until the entire file has been restored. This is the case because no facility exists to prevent the application from attempting to access the unrestored portions of the file, which would result in an error. Consequently, known techniques for restoring data from backup are inadequate for allowing speedy access to the data.

SUMMARY

One aspect of the invention is a method for restoring data. An example of the method includes receiving a request for at least a portion of the data. This example also includes creating a directory entry for the data in a virtual file system, and allocating storage space for the data. This example further includes initializing a block virtualization indicator to a value indicating that the data is not available. This example additionally includes writing a subset of the data to the storage space, and changing the block virtualization indicator to a value indicating that the data is available.

Other aspects of the invention are described in the sections below, and include, for example, a computing system, and a signal bearing medium tangibly embodying a program of machine-readable instructions executable by a digital processing apparatus to perform a method for restoring data.

The invention provides a number of advantages. For example, some examples of the invention advantageously permit access to a portion of a file without first waiting for the entire file to be restored. The invention also provides a number of other advantages and benefits, which should be apparent from the following description.

BRIEF DESCRIPTION OF THE DRAWINGS

FIGS. 4A-4C are a flowchart of an operational sequence for restoring data in accordance with an example of the invention.

DETAILED DESCRIPTION

Figure 1:
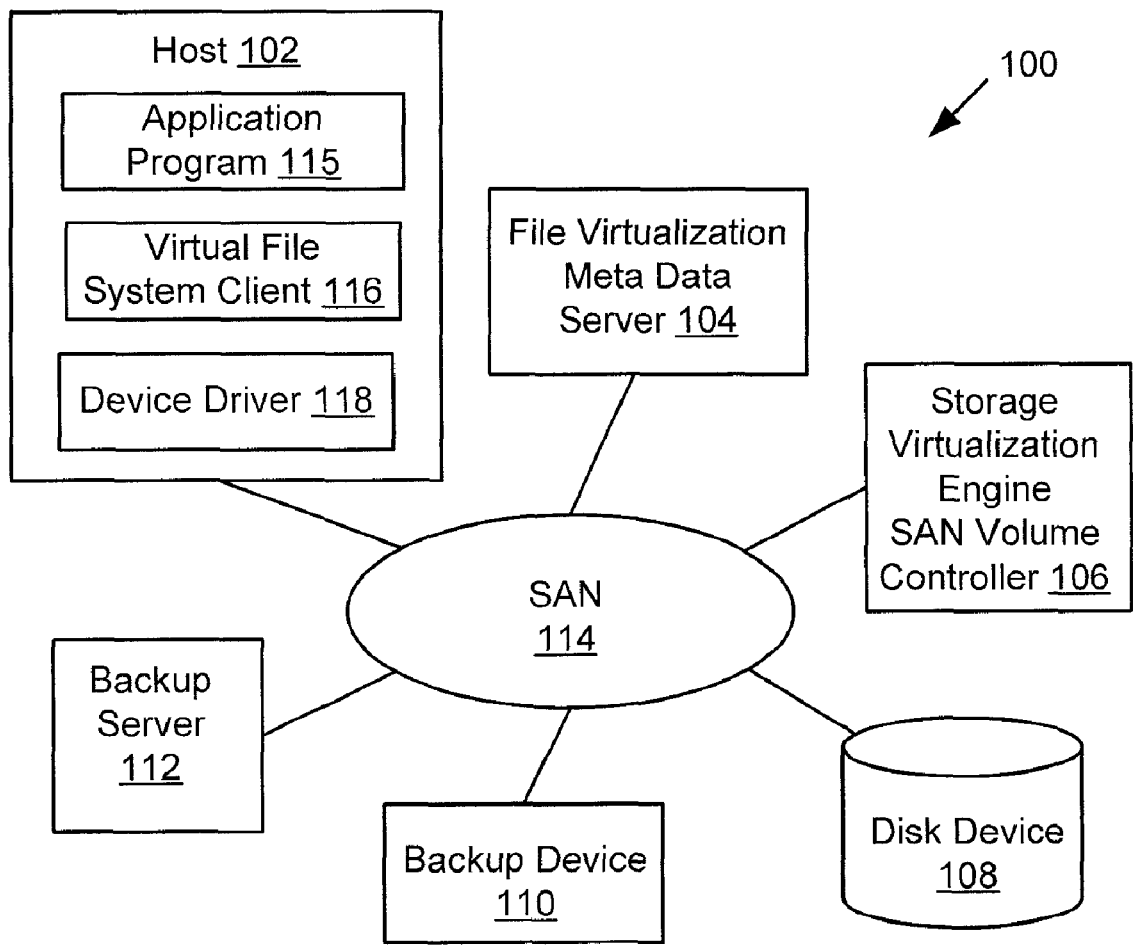
FIG. 1 is a block diagram of the hardware components and interconnections of a computing system in accordance with an example of the invention.

The nature, objectives, and advantages of the invention will become more apparent to those skilled in the art after considering the following detailed description in connection with the accompanying drawings.

I. HARDWARE COMPONENTS AND INTERCONNECTIONS

One aspect of the invention is a computing system for restoring data. As an example, the computing system may be embodied by all, or portions of, the computing system 100 shown in FIG. 1. The computing system 100 may include a host 102 a file virtualization meta data server 104, a storage virtualization engine SAN volume controller 106, a disk device 108, a backup device 110, and may also include a backup server 112, all of which may be coupled together via a SAN (Storage Area Network) 114. Alternatively, a SAN 114 need not be utilized, and the components of the computing system 100 may be coupled directly or through other types of networks.

The host 102 may include an application program 115, a virtual file system client 116, and a device driver 118. As an example, the host 102 system may run one or more application programs that require storing and retrieving data. The host 102 could be implemented, for example, with a computer running the AIX operating system, a Windows 2000 server, or generally any Intel based PC server system, and in a specific example, may be an IBM® P series 304 server.

The storage virtualization engine SAN volume controller 106 is used to implement indirect addressing in a virtual file system. With indirect addressing, the address associated with data is not stored with the data. Rather, with a virtual file system (virtual storage), the address is an indirect pointer to the data, and there is a mapping function between the physical and logical addresses. With a virtual file system, the data and the corresponding pointers are stored in different locations. For example, a metadata server could be used for storing the pointers.

The storage virtualization engine SAN volume controller 106 could be implemented, for example, with an IBM TotalStorage™ SAN Volume Controller, or an IBM TotalStorage™ San Integration Server. The file virtualization meta data server 104 could be implemented, for example, with an IBM TotalStorage™ SAN File System (based on IBM Storage Tank™ technology). As an example, the disk device 108 could be implemented with an IBM FAStT 900 disk storage system, and the backup device 110 could be an IBM Virtual Tape Storage server (VTS). However, any suitable direct access storage could be used for the disk device 108, any suitable sequential backup storage could be used to implement the backup device 110, and any suitable computing devices could be used to implement the host 102, the file virtualization meta data server 104, the storage virtualization engine SAN volume controller 106, and the backup server 112.

In an alternative example, the disk device 108 could be coupled directly to the storage virtualization engine SAN volume controller 106, instead of being coupled to the SAN 114. Generally, data movement for restoring data could be through the backup server 112, or through other storage virtualization, or could be via direct device to device transfer. If included, the backup server 112 provides the capability for direct backup from the disk device 108 to the backup device 110.

Figure 2:
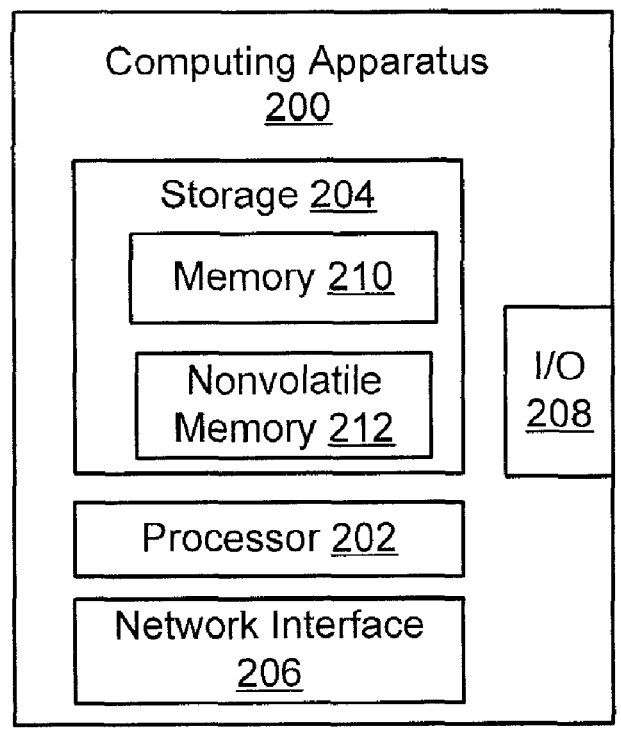
FIG. 2 is a block diagram of the hardware components and interconnections of a computing apparatus in accordance with an example of the invention.

An exemplary computing apparatus 200 is shown in FIG. 2. As an example, the host 102, the file virtualization meta data server 104, the storage virtualization engine SAN volume controller 106, the backup server 112, and any other computing device in the computing system 100 could be implemented with an example of the computing apparatus 200. The computing apparatus 200 includes a processor 202 (which may be called a processing device), and in some examples could have more than one processor 202. As an example, the processor may be a PowerPC RISC processor, available from International Business Machines Corporation, or a processor manufactured by Intel Corporation. The processor 202 may run any suitable operating system, for example, Windows 2000, AIX, Solaris™, Linux, UNIX, or HP-UX™. The computing apparatus 200 may be implemented on any suitable computing device, for example a personal computer, a workstation, a mainframe computer, or a supercomputer. The computing apparatus 200 also includes a storage 204, a network interface 206, and an input/output 208, which are all coupled to the processor 202. The storage 204 may include a primary memory 210, which for example, may be RAM, and a non volatile memory 212. The non-volatile memory 212 could be, for example, a hard disk drive, a drive for reading and writing from optical or magneto-optical media, a tape drive, non-volatile RAM (NVRAM), or any other suitable type of storage. The storage 204 may be used to store data and application programs and/or other programming instructions executed by the processor. The application programs could generally be any suitable applications. The network interface 206 may provide access to any suitable wired or wireless network.

II. OPERATION

In addition to the hardware embodiments described above, other aspects of the invention concern a method for restoring data.

A. Signal-Bearing Media

In the context of FIGS. 1 and 2, the method aspects of the invention may be implemented, for example, by having the host 102, and in some examples, also one or more of the file virtualization meta data server 104, the storage virtualization engine SAN volume controller 106, and the backup server 112, and possibly also the disk device 108 and/or the backup device 110, execute a sequence of machine-readable instructions, which can also be referred to as code. These instructions may reside in various types of signal-bearing media. In this respect, some aspects of the present invention concern a programmed product, comprising a signal-bearing medium or signal-bearing media tangibly embodying a program of machine-readable instructions executable by a digital processing apparatus to perform a method for restoring data.

Figure 3:
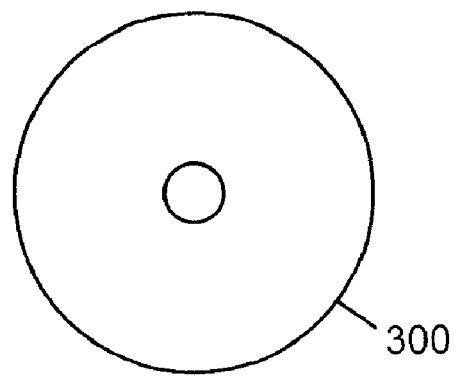
FIG. 3 is an example of a signal-bearing medium in accordance an example of the invention.

This signal-bearing medium may comprise, for example, primary memory 210 and/or non-volatile memory 212. Alternatively, the instructions may be embodied in a signal-bearing medium such as the optical data storage disc 300 shown in FIG. 3. The optical disc can be any type of signal bearing disc or disk, for example, a CD-ROM, CD-R, CD-RW, WORM, DVD-R, DVD+R, DVD-RW, or DVD+RW. Additionally, whether contained in the computing system 100, or elsewhere, the instructions may be stored on any of a variety of machine-readable data storage mediums or media, which may include, for example, a "hard drive", a RAID array, a magnetic data storage diskette (such as a floppy disk), magnetic tape, digital optical tape, RAM, ROM, EPROM, EEPROM, flash memory, programmable logic, any other type of firmware, magneto-optical storage, paper punch cards, or any other suitable signal-bearing media including transmission media such as digital and/or analog communications links, which may be electrical, optical, and/or wireless. For example, in some embodiments the instructions or code may be accessible from a file server over a network, or from other transmission media, and the signal bearing media embodying the instructions or code may comprise a transmission media, such as a network transmission line, wireless transmission media, signals propagating through space, radio waves, and/or infrared signals. Additionally, the signal bearing media may be implemented in hardware logic, for example, an integrated circuit chip, a Programmable Gate Array (PGA), an Application Specific Integrated Circuit (ASIC). As an example, the machine-readable instructions may comprise software object code, compiled from a language such as "C++".

B. Overall Sequence of Operation

Figure 4A:
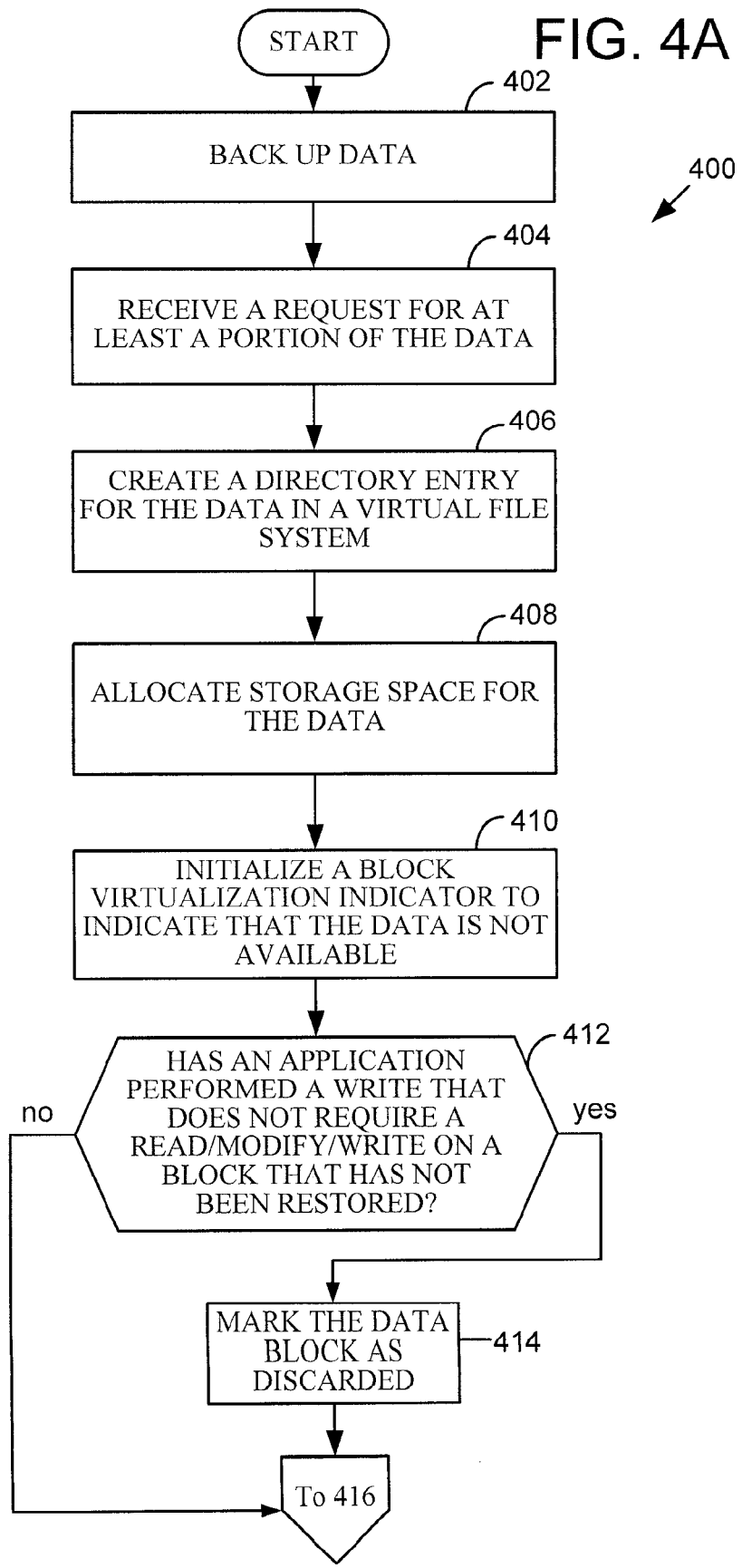
Figure 4B:
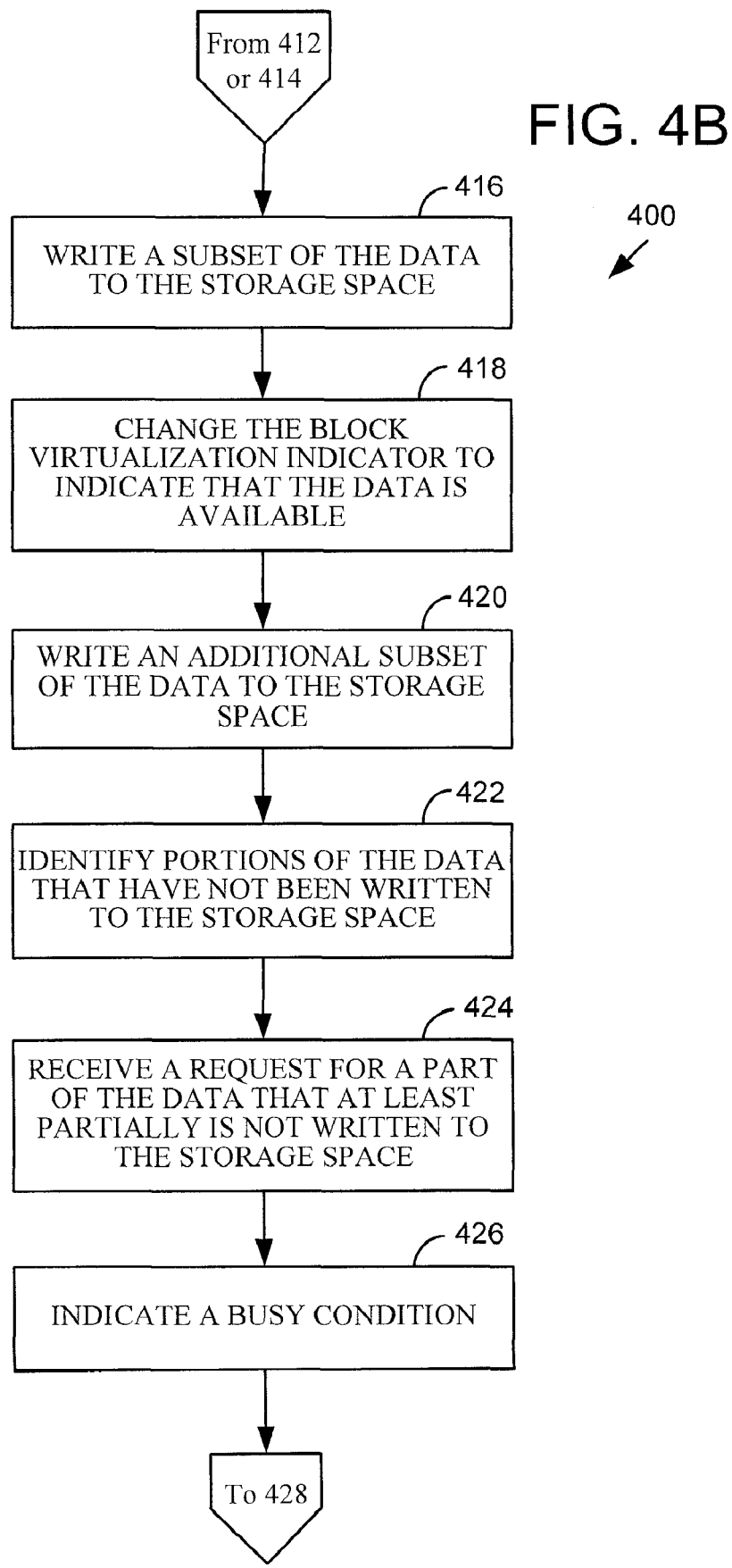

For ease of explanation, but without any intended limitation, exemplary method aspects of the invention are described with reference to the computing system 100 described above and shown in FIG. 1. An example of the method aspect of the present invention is illustrated in FIGS. 4A-4C, which shows a sequence 400 for a method for restoring data. In some examples of the invention, the data may be restored from tape. However, the invention could be beneficially utilized in any environment where the physical storage attributes of storage change, for example, from sequential to direct access, or from direct access to archive. More generally, the invention could be beneficially utilized when the data format has been changed such that the data can not be accessed directly and must be restored to an accessible format.

The operations of the sequence 400 may be performed by the host 102, which may be running an application program 115 that requests the data. The host 102 may also run a backup and restore program. Alternatively, the operations of the sequence 400, may be performed by the host 102 in conjunction with suitably modified versions of the storage virtualization engine 106, the file virtualization meta data server 104, and/or a restore program, and in the case where blocks of the data are restored in an optimized order, a modified backup program.

Referring to FIG. 4A, the sequence 400 may include, and may begin with, operation 402, which comprises backing up data. Small or large amounts of data may be backed up. For example, hundreds of gigabytes of data could be backed up.

As an example, the data may be backed up onto tape. Disk storage is typically organized in blocks of data, which may be large or small. For example, a block could be 512 Bytes or 2048 Bytes. The operation of backing up the data may include storing information identifying the storage locations of each of a plurality of blocks of the data. Herein the term "data" includes any type of data, for example, files and/or raw data.

Backing up the data may further comprise storing metadata with the data. The metadata may include information concerning access characteristics of blocks of the data, which permits optimizing the order in which data blocks are restored. Optimizing the order in which data blocks are restored can improve performance, in comparison with restoring data blocks sequentially, which can produce uneven performance. The access characteristics metadata may be used in embodiments in which the data is retrieved in an order based on the access characteristics. The data access pattern (access characteristics) metadata may be used to predict the order in which parts of the data are likely to be accessed by the application. The data access patterns may be tracked and the metadata may be stored with the data. Alternatively, rather than storing the metadata with the data, the operation of backing up the data may comprise associating metadata that indicates access characteristics of blocks of the data, with the data.

The sequence 400 may further include operation 404, which comprises receiving a request for at least a portion of the data. For example, an application program 115 may request access to a data file. The sequence 400 may further include operation 406, which comprises creating a directory (or folder) entry for the data in a virtual file system. (Unix and DOS use the term "directory", whereas Macintosh computers and Windows use the term "folder.") The operation of creating a directory entry may include creating a pointer for the data in the virtual file system. The sequence 400 may further include operation 408, which comprises allocating sufficient storage space for the data in a physical storage (which may be a file). The sequence 400 may further include operation 410, which comprises initializing a block virtualization indicator to a value indicating that the data is not available.

The sequence 400 may further include operation 412, which comprises identifying if an application performs a write that does not require a read/modify/write on a block of the data that has not yet been restored, and if so the sequence 400 may also include operation 414, which comprises marking the block of the data as discarded for purposes of the restore.

Referring to FIG. 4B, the sequence 400 may further include operation 416, which comprises writing a subset of the data to the storage space. Operation 416 may also include retrieving the data. The sequence 400 may further include operation 418, which comprises changing the block virtualization indicator to a value indicating that the data is available. The virtualization entry is updated to indicate where the data is stored instead of indicating that the data is not available. In some examples, 10% of the blocks, 1 block, or 10,000 blocks may be retrieved and written to the storage space before the block virtualization indicator is changed to indicate that the data is available. The default amount to be retrieved before the block virtualization indicator is changed may be changed.

The sequence 400 may further include operation 420, which comprises writing an additional subset of the data to the storage space. In other words, the restoration of the remainder of the data continues while the data is made available to the application.

The sequence 400 may further include operation 422, which comprises identifying portions of the data that have not been written to the storage space. If a request for a part of the data that is written to the storage space is received, the application is allowed to access that part of the data. The sequence 400 may also include operation 424, which comprises receiving a request for a part of the data that at least partially is not written to the storage space. If a request is received for part of the data that at least partially is not written to the storage space, the sequence 400 may also include operation 426, which comprises indicating a busy condition, which may cause an application and/or operating system to enter a wait state. If the requested part of the data has not been restored by the time of the request, a delay will result because the system may wait to respond to the I/O request, or because the system may send a busy message to the requesting program (and the requesting program may then retry the data request).

Referring to FIG. 4C, the sequence 400 may further include operation 428, which comprises retrieving and writing into the storage space, the requested part of the data that has not been written to the storage space. The sequence 400 may also include operation 430, which comprises responding to the request for the part of the data.

The sequence 400 may further include operation 432, which comprises writing an additional subset of the data to the storage space. The additional subset of the data may be retrieved starting at a location sequentially after the retrieved data. Alternatively, the additional subset of the data may be retrieved starting at a location wherein data is expected to be requested next. Alternatively, the additional subset of the data may be retrieved by starting at a randomly selected location. The requested part of the data that is not written to the storage space may be retrieved on a priority basis. The operation 432 of retrieving an additional subset of the data may be repeated until all of the data has been retrieved. Also, operations 422 to 432 may be repeated if an additional request for a part of the data that at least partially is not written to the storage space, is received.

Some examples of the invention may be embodied as a backup/restore program, a virtualization engine, and a tape virtualization controller. An exemplary embodiment of the invention may be summarized as follows: A file is restored into a storage virtualization engine, and special entries in the virtualization mapping are used to indicate that the data is temporarily unavailable. Once a subset of the file is available, the file is released for application access. If accesses to unavailable portions of the file are detected (by having an unavailable mapping in the virtual device), completion of those particular I/O's is delayed. Thus, an application is permitted to access the portion of the data that has been restored, and waits for data that has not yet been processed. In this manner, partial access to the file can be allowed while preventing incorrect accesses to the unrestored portions. Further optimization of the restore process is possible, to minimize the amount of time an application has to wait for data. The technique of marking data inaccessible in the virtualization engine may also be used to implement block-level Hierarchical Storage Management (HSM), where infrequently accessed blocks are moved to less costly disk, or to tape.

In instances where the following prerequisites are present, with some examples of the invention it is possible to retrieve blocks of data in an order in which the blocks are expected to be used by the application, to further minimize the application wait time. The prerequisites are:

Accesses to the data after the restore is predictable in some way.

It is not prohibitively costly (in elapsed time) to perform the restore in a non-sequential order, such that blocks more likely to be accessed are restored first.

A block virtualization engine is available, which can recognize which data has not been restored and can introduce a block-level wait for the unavailable data.

Applications can tolerate such waits.

If the preceding prerequisites exist, then it is possible to reduce application wait time by restoring data blocks in a particular order. This alternative embodiment may be implemented by storing access metadata with the data when the data is backed up. Alternatively, file access characteristics metadata may be associated with the file after the data is restored.

An exemplary implementation of the invention may be described as follows. At restore time, a directory entry for a file that is to be retrieved is made in a virtual file system, and space is allocated for the file. The block virtualization is initialized to be equal to a "not present being restored" value. Data is then restored in chunks, randomly (instead of serially) in the order that references are expected. Alternatively, the data may just be restored sequentially in the hope it will be accessed in the same way. Once a sufficient quantity of data has been loaded using the expected access pattern, the application that requested the data is allowed to access the data. The amount of data that is sufficient is the quantity of data required so the application will not be likely to experience a delay when accessing the data. The quantity of data that is sufficient is a function of the access pattern of the data and the data type. If the application reads the file before a block desired by the application has been restored, the read may be held and a priority restore action for the desired block may be placed in the queue of items to be restored. If the application performs a write which does not require a read/modify/write, on a block that has not yet been restored, that block may be marked as discarded for purposes of the restore. Unaccessed blocks may be restored sequentially to give good tape performance.

The degree to which examples of the invention can improve data access performance is a function of the amount of data to be restored and the amount of data that the application seeks to access. With some examples of the invention, data could be available in 1/100 of the time, for example, that would otherwise be required. The most significant improvement generally occurs when a large amount of data must be restored and when the amount of data needed by the application program 115 is small in relation to the total amount to be restored.

III. OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A machine readable data storage medium tangibly embodying a program of machine-readable instructions executable by a digital processing apparatus to perform operations for restoring data, the operations comprising:

receiving a request for at least a portion of the data to restore; creating a directory entry for the data to restore in a virtual file system; allocating storage space for the data to restore;

initializing a block virtualization indicator to a value indicating that the data to restore is not available;

writing a subset of the data to restore to the storage space; and changing the block virtualization indicator to a value indicating that the entire data to restore is available for access by an application in response to writing a default amount of the data to restore to the storage space and before the entire data to restore is written to the storage space;

wherein the default amount of the data is smaller than the entire data to restore.

2. The machine readable data storage medium of claim 1, wherein the operations further comprise writing an additional subset of the data to the storage space.

3. The machine readable data storage medium of claim 1, wherein the operations further comprise identifying portions of the data that have not been written to the storage space.

4. The machine readable data storage medium of claim 1, wherein the operations further comprise:

receiving a request for a part of the data that at least partially is not written to the storage space;

retrieving and writing to the storage space the requested part of the data that is not written to the storage space; and responding to the request for the part of the data.

5. The machine readable data storage medium of claim 4, wherein the requested part of the data that is not written to the storage space is retrieved on a priority basis.

6. The machine readable data storage medium of claim 4, wherein the operations further comprise indicating a busy condition.

7. The machine readable data storage medium of claim 4, wherein the operations further comprise retrieving an additional subset of the data, starting at a location sequentially after the retrieved data.

8. The machine readable data storage medium of claim 4, wherein the operations further comprise retrieving an additional subset of the data, starting at a location wherein data is expected to be requested next.

9. The machine readable data storage medium of claim 4, wherein the operations further comprise retrieving an additional subset of the data, starting at a randomly selected location.

10. The machine readable data storage medium of claim 1, wherein the operations further comprise backing up the data.

11. The machine readable data storage medium of claim 10, wherein the operation of backing up the data comprises storing information identifying the storage locations of each of a plurality of blocks of the data.

12. The machine readable data storage medium of claim 10, wherein the operation of backing up the data further comprises storing metadata including access characteristics of blocks of the data, with the data.

13. The machine readable data storage medium of claim 10, wherein the operations further comprise associating with the data, metadata indicating access characteristics of blocks of the data.

14. The machine readable data storage medium of claim 1, wherein the operation of creating a directory entry further comprises creating a pointer for the data in the virtual file system.

15. The machine readable data storage medium of claim 1, wherein the data is restored from tape.

16. The machine readable data storage medium of claim 1, wherein the operations further comprise:
permitting the application to access requested blocks of the data, only if the application requests access to blocks of the data that have been written to the storage space.

17. The machine readable data storage medium of claim 1, wherein the operations further comprise:
indicating a busy condition, and writing blocks of the data for which access is requested, to the storage space on a priority basis, if the application requests access to blocks of the data that have not been written to the storage space.

18. The machine readable data storage medium of claim 17, wherein writing blocks of the data for which access is requested to the storage space on a priority basis comprises indicating a priority for the blocks of the data for which access is requested, in a queue of data items to be restored.

19. The machine readable data storage medium of claim 1, wherein the subset of the data is a designated quantity of blocks of the data.

20. The machine readable data storage medium of claim 1, wherein the default amount of the data to restore has a size that is a function of the access pattern of the data and the data type.

21. The machine readable data storage medium of claim 1, wherein the default amount of the data is 1 block of the data.

22. The machine readable data storage medium of claim 1, wherein the default amount of the data is 10,000 blocks of the data.

23. The machine readable data storage medium of claim 1, wherein the subset default amount of the data is 10 percent of data blocks of the data.

24. The machine readable data storage medium of claim 1, wherein the data is a file, and wherein the portion of the data is a portion of the file.

25. The machine readable data storage medium of claim 1:
wherein the data is restored from a first storage, and wherein the first storage is a sequential access storage; and
wherein the storage space is allocated in a second storage, and wherein the second storage is a direct access storage.

26. The machine readable data storage medium of claim 1:
wherein the data is restored from a first storage, and wherein the data is compressed when stored on the first storage; and
wherein the storage space is allocated in a second storage, and wherein the data is not compressed when stored on the second storage.

27. A machine readable data storage medium tangibly embodying a program of machine-readable instructions executable by a digital processing apparatus to perform operations for restoring data, the operations comprising:
restoring the data into a storage virtualization engine;
using special entries in a virtualization mapping to indicate that the data is temporarily unavailable;
retrieving a subset of the data and writing the subset of the data to a storage space;
releasing the entire data to restore for an application in response to writing a default amount of the data to restore to the storage space and before the entire data to restore is written to the storage space; and
delaying completion of I/O requests for accesses to portions of the data that are identified as being unavailable in an unavailable mapping;
wherein the default amount of the data is smaller than the entire data to restore.

28. A machine readable data storage medium tangibly embodying a program of machine-readable instructions executable by a digital processing apparatus to perform operations for restoring data, the operations comprising:
storing access metadata with the to restore data;
creating a directory entry for the data to restore in a virtual file system and allocating space for the data;
initializing a block virtualization to be equal to a "not present being restored" value;
begin restoring the data in blocks in an order in which references to the blocks are expected;
allowing an application to begin using the entire restored data in response to writing a default amount of the data to restore is restored using the order in which references to the blocks are expected, and before the entire data to restore is written to the storage space; and
delaying a read and placing a priority restore action in a restore queue, if the application attempts to read from a block of the data that has not been restored;
wherein the default amount of the data is smaller than the entire data to restore.

29. A computing system, comprising:
a memory; and
a processing device coupled to the memory, wherein the processing device is programmed to perform operations for restoring data, the operations comprising:
receiving a request for at least a portion of the data to restore;
creating a directory entry for the data to restore in a virtual file system;
allocating storage space for the data to restore;
initializing a block virtualization indicator to a value indicating that the data to restore is not available;
writing a subset of the data to restore to the storage space; and
changing the block virtualization indicator to a value indicating that the entire data to restore is available for access by an application in response to writing a default amount of the data to restore to the storage space and before the entire data to restore is written to the storage space;
wherein the default amount of the data is smaller than the entire data to restore.

30. The computing system of claim 29, wherein the memory and the processing device are part of a host, and further comprising:
a file virtualization meta data server coupled to the host; and
a storage virtualization engine SAN volume controller coupled to the host.

31. The computing system of claim 30, further comprising a disk device and a backup device coupled to the storage virtualization engine SAN volume controller.

32. A computing system, comprising:
means for receiving a request for at least a portion of data to restore;
means for creating a directory entry for the data to restore in a virtual file system;
means for allocating storage space for the data to restore;
means for initializing a block virtualization indicator to a value indicating that the data to restore is not available;
means for writing a subset of the data to restore to the storage space; and
means for changing the block virtualization indicator to a value indicating that the entire data to restore is available for access by an application in response to writing a default amount of the data to restore to the storage space and before the entire data to restore is written to the storage space;

wherein the default amount of the data smaller than the entire data to restore.

33. A method for restoring data, comprising the following operations:

receiving a request for at least a portion of data to restore;

creating a directory entry for the data to restore in a virtual file system;

allocating storage space for the data to restore;

initializing a block virtualization indicator to a value indicating that the data to restore is not available;

writing a subset of the data to restore to the storage space; and changing the block virtualization indicator to a value indicating that the entire data to restore is available for access by an application in response to writing a default amount of the data to restore to the storage space and without waiting for the entire data to restore is written to the storage space; wherein the default amount of the data is smaller than the entire data to restore.

34. The method of claim 33, wherein the operations further comprise identifying portions of the data that have not been written to the storage space.

35. The method of claim 33, wherein the operations further comprise;

receiving a request for a part of the data that at least partially is not written to the storage space;

retrieving and writing to the storage space the requested part of the data that is not written to the storage space; and responding to the request for the part of the data.

36. The method of claim 33, wherein the operations further comprise associating with the data, metadata indicating access characteristics of blocks of the data.

* * * * *